March 19, 1935. A. J. SAARINEN 1,995,079
FLUID METER
Filed Aug. 8, 1933 6 Sheets-Sheet 1
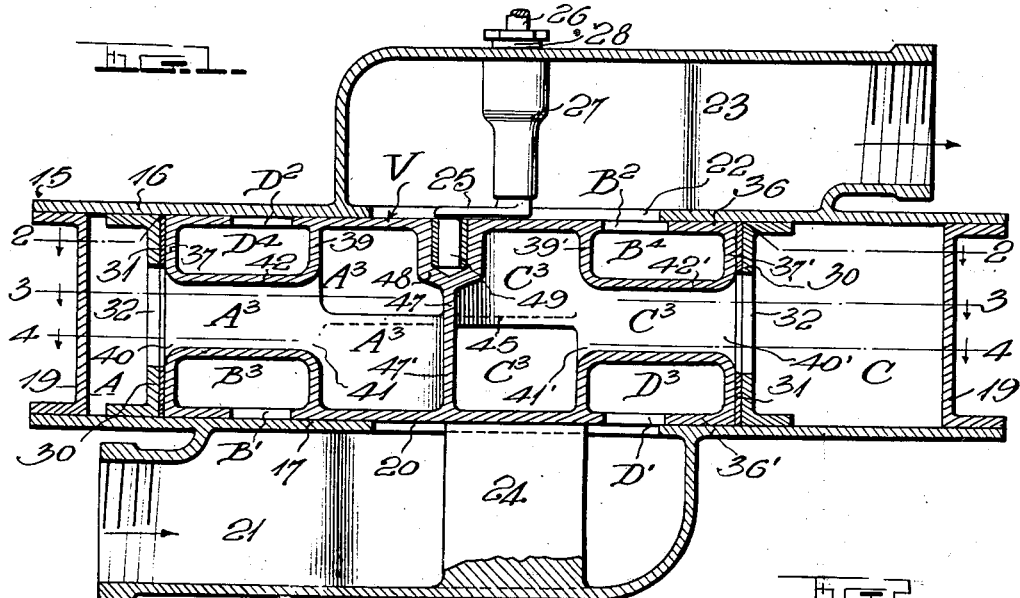
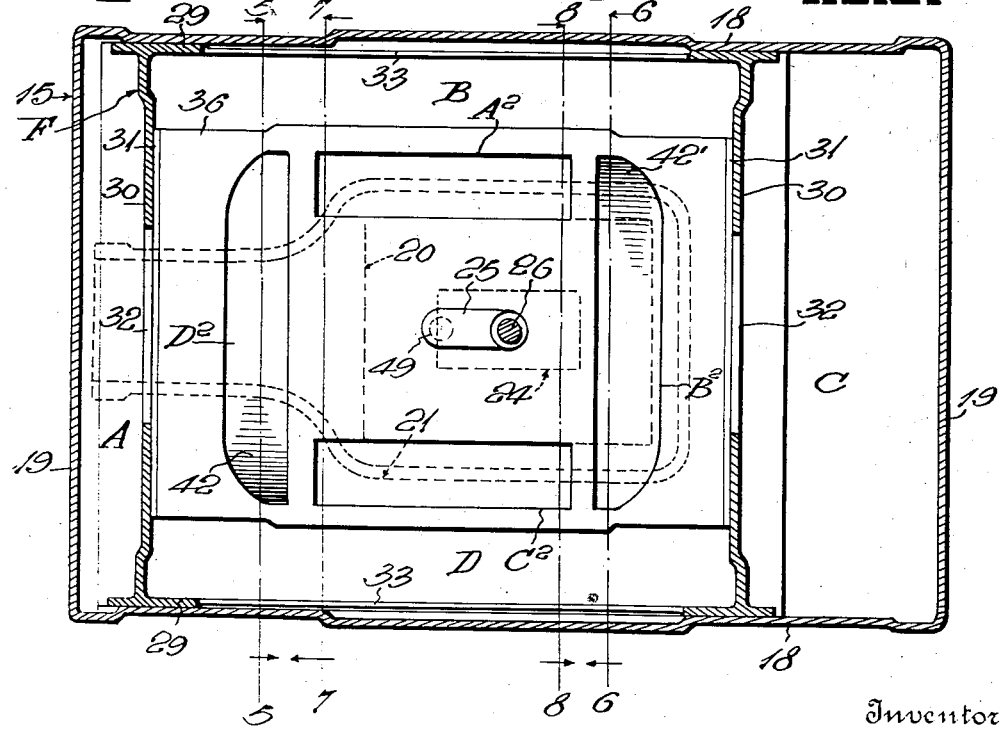
Inventor
A. J. Saarinen
By [signature]
Attorney March 19, 1935.  A. J. SAARINEN  1,995,079
FLUID METER
Filed Aug. 8, 1933  6 Sheets-Sheet 2
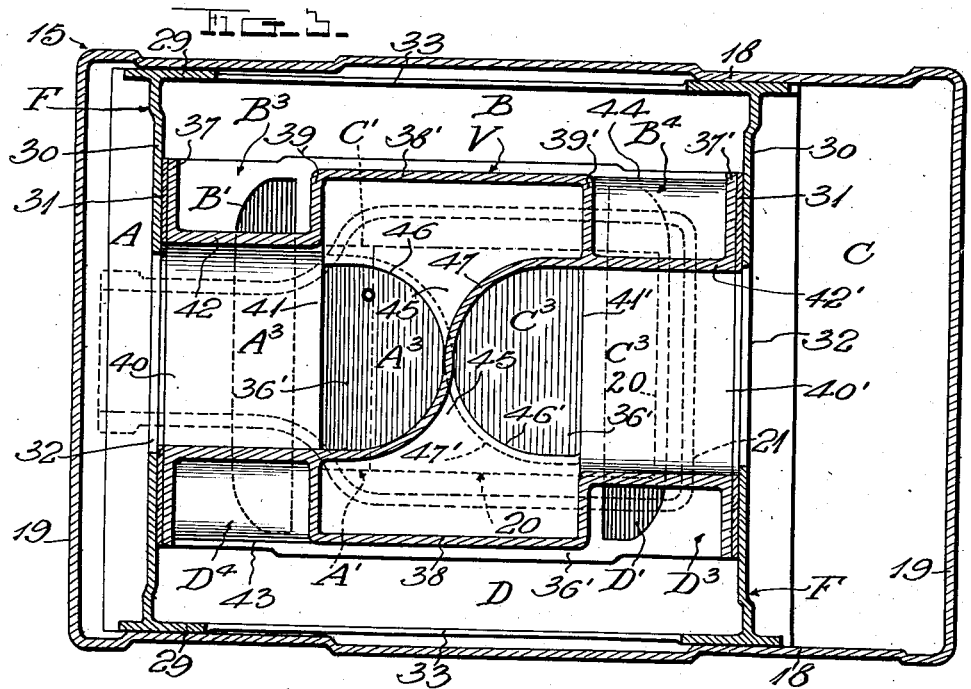
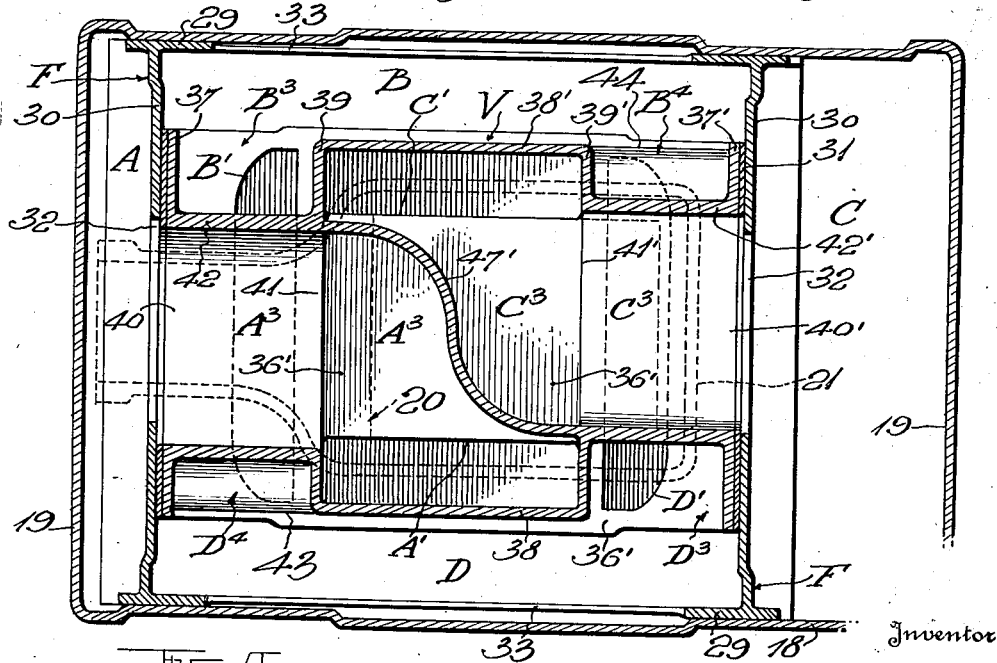
Inventor
A. J. Saarinen
By
Attorney

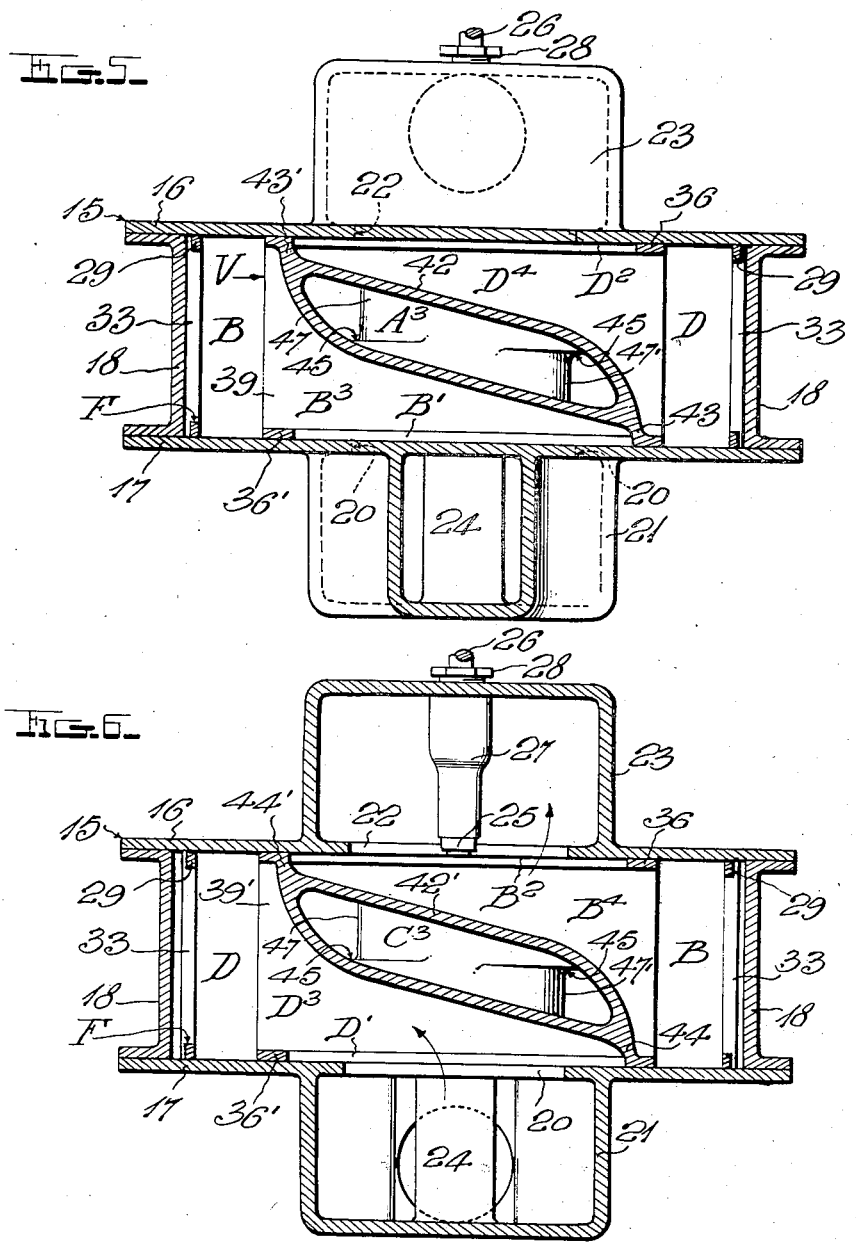

March 19, 1935.  A. J. SAARINEN  1,995,079
FLUID METER
Filed Aug. 8, 1933   6 Sheets-Sheet 4
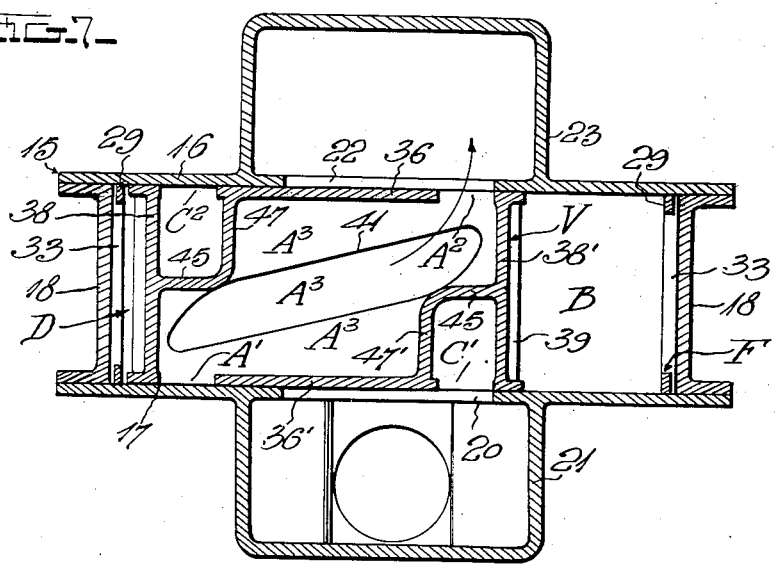
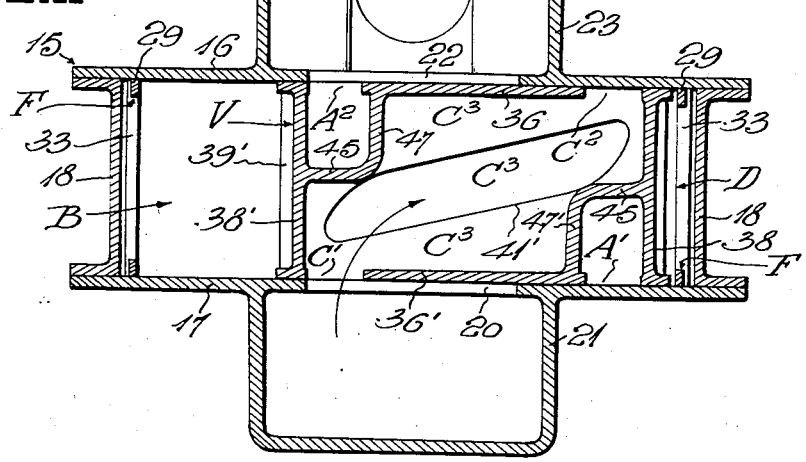
Inventor
A. J. Saarinen
By
Attorney March 19, 1935.  A. J. SAARINEN  1,995,079
FLUID METER
Filed Aug. 8, 1933  6 Sheets-Sheet 5
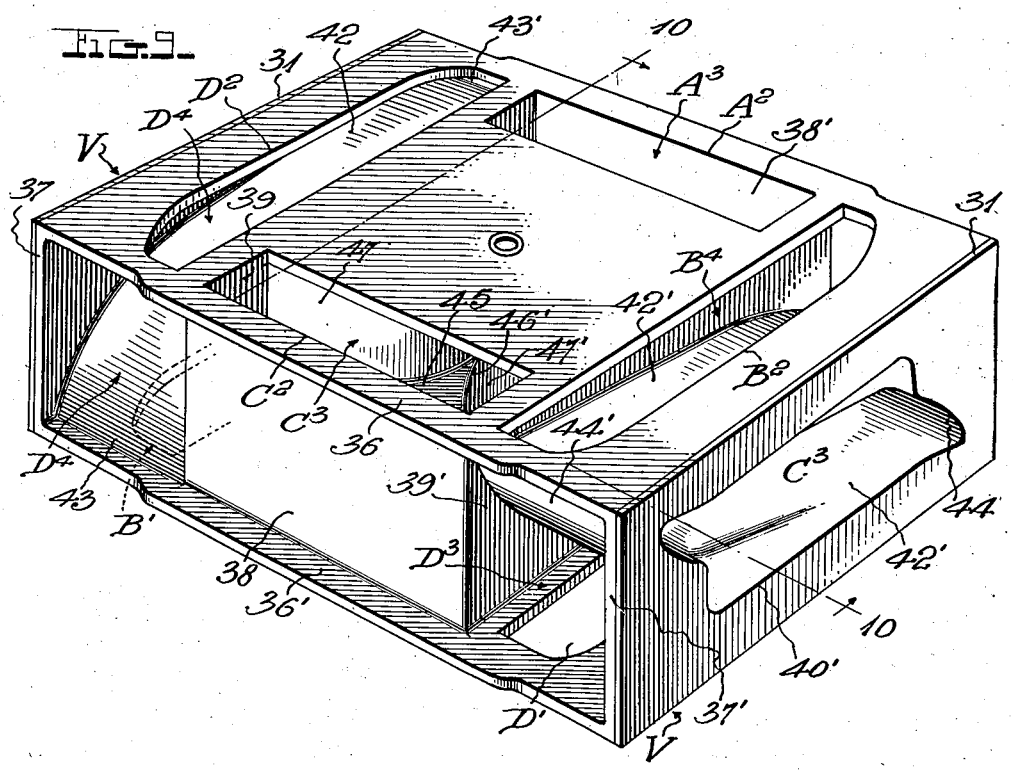
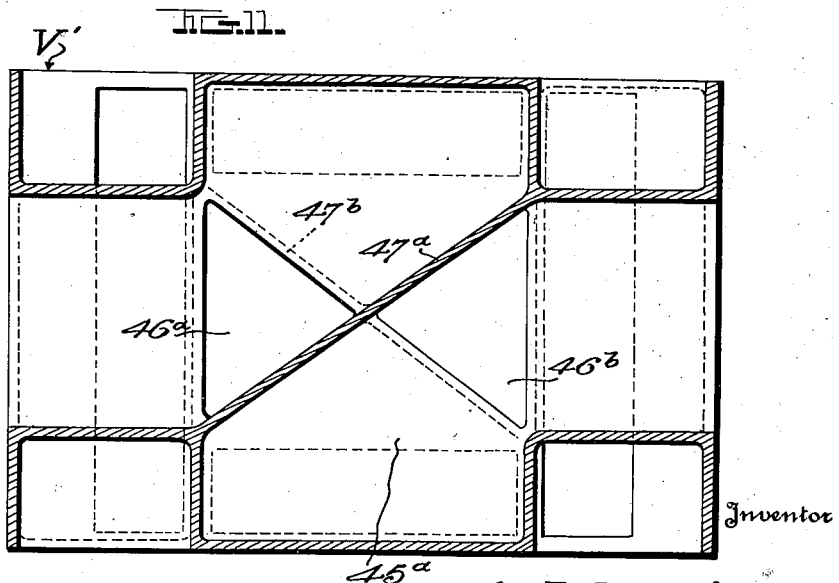
Inventor
A. J. Saarinen
By
Attorney March 19, 1935.  A. J. SAARINEN  1,995,079
FLUID METER
Filed Aug. 8, 1933   6 Sheets-Sheet 6
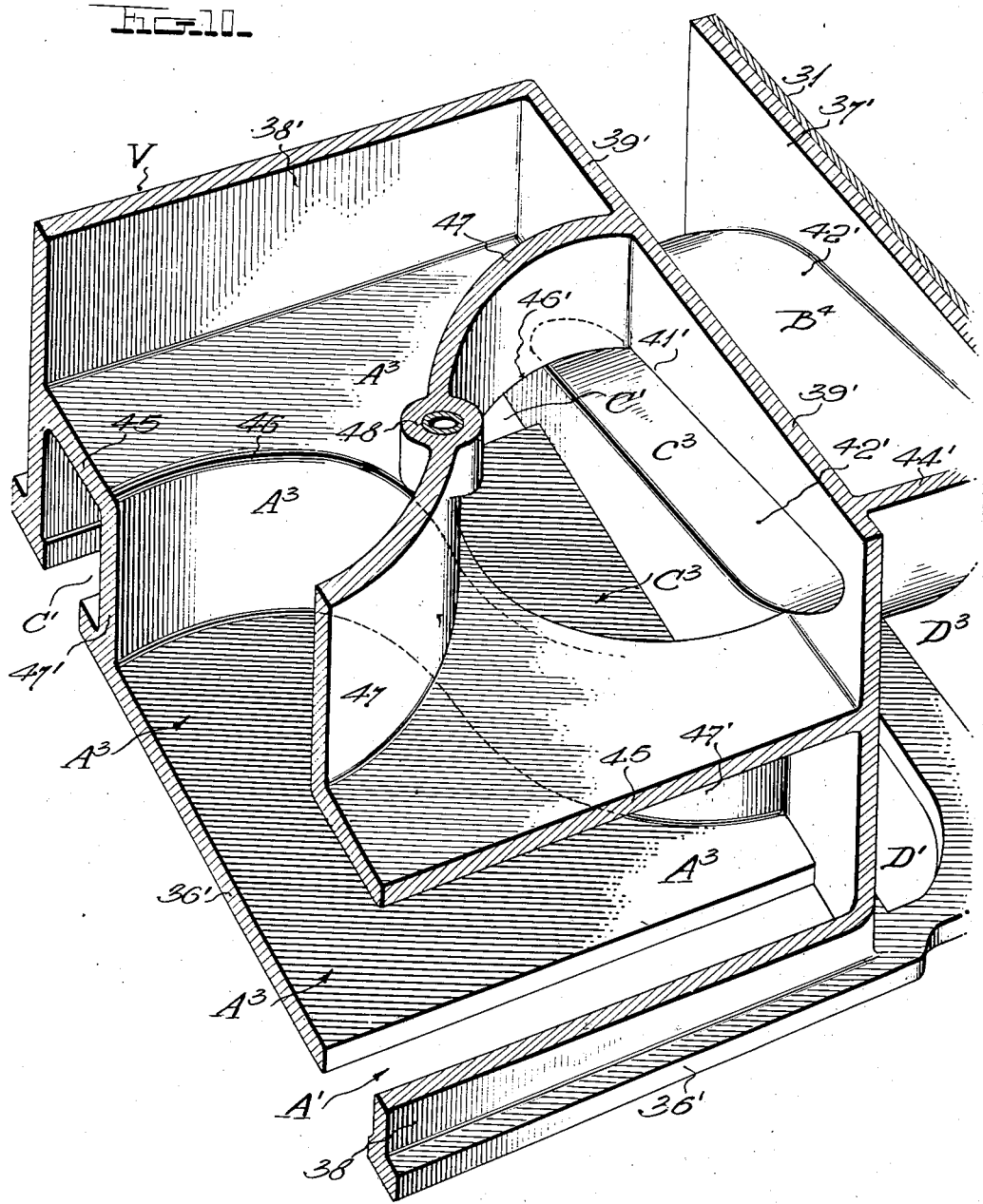
Inventor
A. J. Saarinen
By
Attorney Patented Mar. 19, 1935

1,995,079

UNITED STATES PATENT OFFICE 1,995,079

FLUID METER

Armas J. Saarinen, San Francisco, Calif., assignor to Granberg Meter Corporation, San Francisco, Calif., a corporation of California Application August 8, 1933, Serial No. 684,269

6 Claims. (Cl. 73—30)

The invention relates to fluid meters of the type in which a ported gyratory valve is cooperable with other meter parts in forming expansible and contractible measuring chambers, and in which said gyratory valve controls the admission of fluid to and the exhaust of fluid from said measuring chambers. Heretofore, in such meters, the fluid admission and exhaust passages have all opened through one side of the gyratory valve and meter casing and have been of such sizes as to cause quite an amount of liquid friction, which difficulty could not be overcome without so increasing the sizes of meter parts as to add materially to cost and even then producing a meter too bulky for some installations, for instance, on tank trucks.

The present invention aims to improve upon meters of the type set forth by so re-arranging the admission and exhaust passages that one half of the number of said passages opens through one side of the gyratory valve and meter casing, while the other half opens through the opposite side of said valve and casing. I am thus enabled to provide passages of ample size to materially lessen liquid friction, without increasing the overall dimensions of the meter in any objectionable manner. In the preferred construction, all of the admission passages open through one side of the valve and casing, and all of the exhaust passages through the opposite side thereof.

In carrying out the above end, further objects have been to provide an improved gyratory valve having a novel arrangement of fluid conducting passages and ports, and to provide an improved meter casing, opposite side walls of which carry the admission and exhaust manifolds and the associated ports which co-act with the valve ports.

With the foregoing objects in view, the invention resides in the novel subject matter hereinafter described and claimed, description being accomplished by reference to the accompanying drawings.

Fig. 1 is a central vertical longitudinal sectional view of the improved meter.

Fig. 2 is a horizontal section partly in elevation on line 2—2 of Fig. 1.

Figs. 3 and 4 are horizontal sectional views on lines 3—3 and 4—4 of Fig. 1 respectively.

Fig. 5 is a vertical transverse sectional view on line 5—5 of Fig. 2 showing more particularly the admission passage $B^3$ and admission port $B^1$ for chamber B, and the exhaust passage $D^4$ and exhaust port $D^2$ for chamber D, both of said ports being closed.

Fig. 6 is a view similar to Fig. 5 on line 6—6 of Fig. 2, showing more particularly the exhaust passage $B^4$ and port $B^2$, for chamber B and the admission passage $D^3$ and port $D^1$, for chamber D, both ports being open.

Fig. 7 is a transverse sectional view on line 7—7 of Fig. 2 showing more particularly the valve-contained passage $A^3$, the admission port $A^1$ and the exhaust port $A^2$ for chamber A, said passage serving to conduct both the unmeasured fluid to and the measured fluid from said chamber A, the valve being in a position at which the exhaust port $A^2$ is open and the admission port $A^1$ closed.

Fig. 8 is a view similar to Fig. 7, cut on line 8—8 of Fig. 2, showing the valve-contained passage $C^3$, the admission port $C^1$ and the exhaust port $C^2$ for chamber C, said passage serving to conduct both the unmeasured fluid to and the measured fluid from said chamber C, the valve being in the same position as in Fig. 7, showing the admission port $C^1$ open and the exhaust port $C^2$ closed.

Fig. 9 is a perspective view of the valve.

Fig. 10 is a sectional perspective view showing parts of the valve cut substantially on line 10—10 of Fig. 9 with the upper side wall of the valve however, cut off.

Fig. 11 is a horizontal sectional view showing a slightly different valve.

Preferred features of construction have been illustrated in the drawings above briefly described, and will be rather specifically explained, with the understanding however, that within the scope of the invention as claimed, variations may be made.

The meter casing 15 is provided with parallel side walls 16 and 17, with parallel longitudinal edge walls 18 and with end walls 19, the walls 18 and 19 being integral with each other and the walls 16 and 17 detachably secured. The side wall 17 is provided with an admission port 20 and with an admission manifold 21 in communication with said admission port. Similarly, the side wall 16 is formed with an exhaust port 22 and with an exhaust manifold 23. The manifold 21 carries a post 24 occupying only a small portion of the admission port 20 and serving as a central support for the gyratory valve V. This valve is guided on a circular path by a crank 25 on a register-driving shaft 26 which passes through a bearing 27 and stuffing box 28 carried by the exhaust manifold 23.

The valve V is transversely reciprocable within a rectangular frame F which is reciprocable longitudinally within the casing 15, said valve and frame both slidably engaging the casing side walls 16 and 17. The frame F is provided with longitudinal edge walls 29 slidably contacting with the casing edge walls 18, and said frame is formed with parallel end walls 30 slidably engaged by the ends of the valve V, said valve ends preferably having wear plates 31. The frame ends 30 are formed with quite large central openings 32 through which fluid passes during the operation of the meter, and the edge walls 29 are formed with longitudinal openings 33 in the present showing.

As the valve V gyrates on the circular path dictated by the crank 25, it reciprocates transversely in the frame F and said frame reciprocates longitudinally in the casing 15, and during such movements of parts, the measuring chambers A, B, C and D successively expand to receive the fluid to be measured, and successively contract to discharge the measured fluid. When chamber C is expanding and admitting the fluid to be measured, chamber A is contracting and discharging the fluid measured therein, and vice versa. Similarly, when chamber B is expanding and receiving the fluid to be measured, chamber D is contracting and discharging the fluid which it has measured, and vice versa. The fluid entering the measuring chambers from the admission port 20 and manifold 21, and the measured fluid leaving said chambers en route to the exhaust port 22 and manifold 23, flows through conducting passages within the valve V, which will later be referred to by reference characters, but it may here be stated that these passages include four admission ports $A^1$, $B^1$, $C^1$ and $D^1$ all in one side of valve V for periodic registration with the admission port 20, and four exhaust ports $A^2$, $B^2$, $C^2$ and $D^2$ all opening through the opposite side of valve V for similar communication with the exhaust port 22. For ease in reading the drawings, the ports which serve the chamber A have been identified as $A^1$ and $A^2$; those for chamber B, as $B^1$ and $B^2$; those for chamber C, as $C^1$ and $C^2$; and those for chamber D, as $D^1$ and $D^2$.

The admission ports $B^1$ and $D^1$ for chambers B and D, open respectively into transverse passages $B^3$ and $D^3$ opening through the longitudinal edges of said valve (see Figs. 5 and 6). The exhaust ports $B^2$ and $D^2$ for chambers B and D, open respectively into transverse passages $B^4$ and $D^4$ also formed in the end portions of the valve V and opening through said longitudinal edges of said valve as also seen in Figs. 5 and 6.

The admission port $A^1$ and exhaust port $A^2$ for chamber A both open into a combined admission and exhaust passage $A^3$ (see Fig. 7) which opens through one end of valve V (see Figs. 1, 3 and 4). The admission port $C^1$ and exhaust port $C^2$ for chamber C, both open into a combined admission and exhaust passage $C^3$ (see Fig. 8) which opens through the other end of valve V as seen in Figs. 1, 3, 4, 9 and 10.

All of the valve passages $B^3$, $B^4$, $D^3$, $D^4$, $A^3$ and $C^3$ are provided by a novel structure for the valve V which will now be described in detail. This valve is of hollow rectangular form and is provided with parallel side walls 36 and 36' for sliding contact with the casing side walls 16 and 17 respectively, the wall 36 having the exhaust ports $A^2$, $B^2$, $C^2$ and $D^2$, while the admission ports $A^1$, $B^1$, $C^1$ and $D^1$ are formed in the wall 36'. Parallel end walls 37 and 37' are integral with the side walls 36 and 36', and longitudinal edge walls 38 and 38' are also integral with said side walls 36 and 36', said edge walls 38 and 38' terminating short of the end walls 37 and 37'. Two transverse partitions 39 and 39' are spaced inwardly from the end walls 37 and 37' and are integral with the ends of the longitudinal edge walls 38 and 38', and the side walls 36 and 36'. The end walls 37 and 37' are formed with elongated openings 40 and 40', and the partitions 39 and 39' are formed with similar openings 41 and 41', said openings being alined. Two sleeves 42 and 42' are disposed between the end walls 37 and 37' and the partitions 39 and 39', said sleeves being integrally joined to said end walls and partitions around the openings 40 and 40' and 41 and 41'. The sleeves 42 and 42' in the present showing, are inclined transversely of the valve in opposite directions and the lower extremity of the sleeve 42 is integrally joined to the side wall 36' near one longitudinal edge of the latter, as seen at 43, while the upper extremity of said sleeve 42 is integrally joined to the side wall 36 near the opposite longitudinal edge of the latter, as seen at 43', thereby forming the admission passage $B^3$ under said sleeve 42 and the exhaust passage $D^4$ above said sleeve 42. The lower extremity of sleeve 42' is integrally joined at 44 to the side wall 36' near one longitudinal edge thereof, and the upper extremity of said sleeve 42' is similarly joined at 44' to the side wall 36 near the other longitudinal edge of said side wall 36, thereby forming the admission passage $D^3$ below said sleeve 42' and the exhaust passage $B^4$ above said sleeve 42'.

A web 45 extends across the interior of the valve V in a plane substantially midway between the side walls 36 and 36', said web being integral with the longitudinal edge walls 38 and 38' and with the partitions 39 and 39'. The ends of this web 45 are formed with large notches 46 and 46' which communicate with the inner ends of the sleeves 42 and 42' respectively, and crossed diagonal partitions 47 and 47' are provided at opposite sides of said web 45. The ends of the crossed partitions 47 and 47' are integrally joined to the transverse partitions 39 and 39'. Partition 47 is integral with web 45 and side wall 36, and partition 47' is integral with the web 45 and the other side wall 36'. Half the length of partition 47 extends along one edge of the notch 46 and the other half along the opposite edge of notch 46'. Half the length of partition 47' extends along the other edge of notch 46 and the other edge of notch 46'. The web 45, partitions 47 and 47' and sleeves 42 and 42' are thus instrumental in forming the combined admission and exhaust passages $A^3$ and $C^3$.

At their juncture with each other, the partitions 47 and 47' are preferably thickened to provide a bearing 48 for the crank pin 49 of crank 25.

In the present showing, the valve exhaust ports $A^2$, $B^2$, $C^2$ and $D^2$ are elongated slots, $A^2$ and $C^2$ extending longitudinally of the valve V near its longitudinal edges, while $B^2$ and $D^2$ extend transversely of said valve near its ends. The admission ports $A^1$, $B^1$, $C^1$ and $D^1$ also are elongated slots and they are directly under $C^2$, $D^2$, $A^2$ and $B^2$ respectively. The admission port 20 and exhaust port 22 of the casing are both rectangular in the present showing, possess the same size and are identically located in the opposite side walls of the casing 15. As the valve V gyrates, the admission and exhaust ports of the casing and valve register in proper sequence and when any measuring chamber starts to intake, the opposite measuring chamber starts to exhaust, and vice versa.

In Fig. 11, the valve $V^1$ may be considered as substantially identical with the valve V, exceptions however, being that the notches $46^a$ and $46^b$ in the web $45^a$, are triangular, and the crossed diagonal partitions $47^a$ and $47^b$ are straight.

From the foregoing and the accompanying drawings, it will be seen that an improved meter has been provided in which the admission and exhaust passages and ports are so distributed at opposite sides of the gyratory valve, as to enable said ports and passages to be formed of ample size for materially decreasing liquid friction. Moreover, the overall dimensions of the meter need not be objectionably enlarged in producing the improved structure.

What is claimed is:—

1. A meter comprising a casing having parallel side walls, one of said side walls being provided with a single relatively large rectangular admission port, the other of said side walls having a single relatively large rectangular exhaust port, a slidably engaged reciprocable frame and gyratory valve within the casing slidably contacting with said side walls, means for confining said valve to a circular path, said valve, frame and casing being co-operable in forming four expansible and contractible measuring chambers, one side of said valve being provided with two elongated longitudinal admission slots and with two elongated transverse admission slots, these four admission slots being disposed for co-action with the four edges of said rectangular admission port respectively to control the admission of fluid to said measuring chambers, the opposite side of said valve being provided with two elongated longitudinal exhaust slots and with two elongated transverse exhaust slots, these four exhaust slots being disposed for co-action with the four edges of said rectangular exhaust port respectively to control the exhaust of fluid from said measuring chambers, said valve being provided with admission and exhaust passages so communicating with said measuring chambers and with said admission and exhaust slots as to conduct fluid from said admission slots to the expanding measuring chambers and from the contracting measuring chambers to said exhaust slots.

2. In a meter of the gyratory valve type, a casing having two parallel valve-engaging side walls, one of said side walls having a single rectangular admission port and an admission manifold communicating with said admission port, the other of said side walls being provided with a single rectangular exhaust port and with an exhaust manifold communicating with said exhaust port, said admission and exhaust ports each having four straight edges, and a slidably engaged reciprocable frame and gyratory valve within said casing, said gyratory valve having straight-edged admission and exhaust slots for co-operation with said ports.

3. In a meter of the gyratory valve type, a valve having four straight elongated conducting slots for the fluid to be measured and four straight elongated conducting slots for the measured fluid, four of said slots opening through one side of said valve and being located to occupy the four sides of a rectangle respectively, the other four of said slots opening through the opposite side of said valve and being also located to occupy the four sides of a rectangle respectively.

4. In a gyratory valve meter, a valve body having two parallel sides, two longitudinal edges and two ends, one of said sides having two elongated longitudinal admission slots near said longitudinal edges and two elongated transverse admission slots near said ends, the other of said sides being provided with two elongated longitudinal exhaust slots near said longitudinal edges and with two elongated transverse exhaust slots near said ends; said body being formed with admission and exhaust passages opening through said edges and ends and in operative communication with said admission and exhaust slots.

5. In a gyratory valve meter, a valve body having two flat parallel sides, two longitudinal edges and two parallel ends; the end portions of said valve having two transverse admission passages opening through said longitudinal edges respectively, and two transverse exhaust passages opening through said longitudinal edges respectively, one of said flat sides having admission ports near its ends and opening into said admission passages, and the other of said flat sides having exhaust ports near its ends opening into said exhaust passages; said body having substantially longitudinal combined admission and exhaust passages opening through said parallel ends of said body; said one of said flat sides having admission ports opening into said combined admission and exhaust passages, the other of said flat sides being formed with exhaust ports also opening into said combined admission and exhaust passages.

6. In a gyratory valve meter, a hollow valve comprising parallel side walls, parallel end walls joined to said side walls, longitudinal edge walls joined to said side walls but terminating short of said end walls, two transverse partitions spaced inwardly from said end walls, said partitions being joined to the ends of said edge walls and joined to said side walls, said end walls and partitions having alined openings, two fluid conducting sleeves between said end walls and said partitions and joined thereto around said openings, said sleeves being spaced from said parallel side walls; the sleeve at one end of the valve being joined to one of said side walls adjacent one longitudinal edge of the latter, and being joined to the other of said side walls adjacent the opposite longitudinal edge of the same; the sleeve at the opposite end of the valve being joined to said one side wall adjacent the other longitudinal edge of the latter, and being joined to said other side wall adjacent the other longitudinal edge of the same, thereby providing two fluid admission passages between said sleeves and one of said parallel side walls and opening at opposite longitudinal edges of the valve, and two fluid exhaust passages between said sleeves and the other of said parallel side walls and also open at said opposite longitudinal edges of said valve; said one of said side walls having admission ports opening into said admission passages, and the other of said side walls being provided with exhaust ports opening into said exhaust passages; a web in a plane substantially midway between said side walls and joined to said partitions and said longitudinal edge walls, the ends of said web having notches communicating with said sleeves respectively, and diagonal crossed partitions at opposite sides of said web, said crossed partitions being joined at their ends to said transverse partitions and being joined at their longitudinal edges to said web and said side walls, half the length of one of said crossed partitions extending along one edge of one of said notches and the other half along the opposite edge of the other notch, the other of said crossed partitions extending along the remaining edges of said notches, said sleeves, web and crossed partitions assisting in forming two combined fluid admission and exhaust passages opening through the ends of the valve; the aforesaid one of said side walls having admission ports opening into said two combined admission and exhaust passages respectively; the other of said side walls being provided with exhaust ports also opening into said two combined admission and exhaust passages respectively.

ARMAS J. SAARINEN.